(12) United States Patent
Hanaoka

(10) Patent No.: US 6,898,006 B2
(45) Date of Patent: May 24, 2005

(54) MICROSCOPE

(75) Inventor: Minoru Hanaoka, Kamiina-gun (JP)

(73) Assignee: Olympus Optical Co., Ltd., Tokyo (JP)

( * ) Notice: Subject to any disclaimer, the term of this patent is extended or adjusted under 35 U.S.C. 154(b) by 112 days.

(21) Appl. No.: 10/322,944

(22) Filed: Dec. 18, 2002

(65) Prior Publication Data
US 2003/0117701 A1 Jun. 26, 2003

(30) Foreign Application Priority Data
Dec. 26, 2001 (JP) ......................................... 2001-395141

(51) Int. Cl.[7] ............................................. G02B 21/06
(52) U.S. Cl. ..................................... 359/390; 359/389
(58) Field of Search .......................... 359/368, 381, 359/384, 385, 388, 389, 390

(56) References Cited

U.S. PATENT DOCUMENTS

| | | | | |
|---|---|---|---|---|
| 2,289,575 A | * | 7/1942 | Critoph et al. | 362/419 |
| 3,186,296 A | * | 6/1965 | Erban | 356/237.2 |
| 4,210,384 A | * | 7/1980 | Meyer et al. | 359/363 |
| 4,573,772 A | * | 3/1986 | Endo et al. | 359/370 |
| 4,690,522 A | * | 9/1987 | Welsh | 359/390 |
| 4,770,520 A | * | 9/1988 | Hoogesteger | 359/513 |
| 5,225,929 A | * | 7/1993 | Ulanowski | 359/389 |
| 5,825,536 A |   | 10/1998 | Yasunaga et al. | |
| 6,690,510 B2 | * | 2/2004 | Kanao | 359/380 |

FOREIGN PATENT DOCUMENTS

| | | |
|---|---|---|
| DE | 18 39 654 U | 10/1961 |
| DE | 31 51 837 A1 | 10/1982 |

* cited by examiner

*Primary Examiner*—Mark A. Robinson
(74) *Attorney, Agent, or Firm*—Frishauf, Holtz, Goodman & Chick, P.C.

(57) ABSTRACT

There is disclosed a microscope constitution in which an base including an image pickup device is disposed confronting the underside of a stage portion via an optical portion having a linear optical axis, and a lighting head is assembled/disposed with respect to the stage portion so as to be rotatable/adjustable around two axes different from the optical axis via first and second arms.

8 Claims, 8 Drawing Sheets

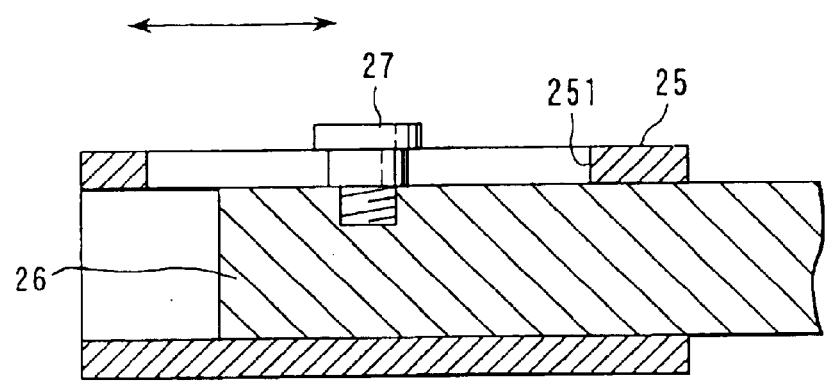
FIG. 6
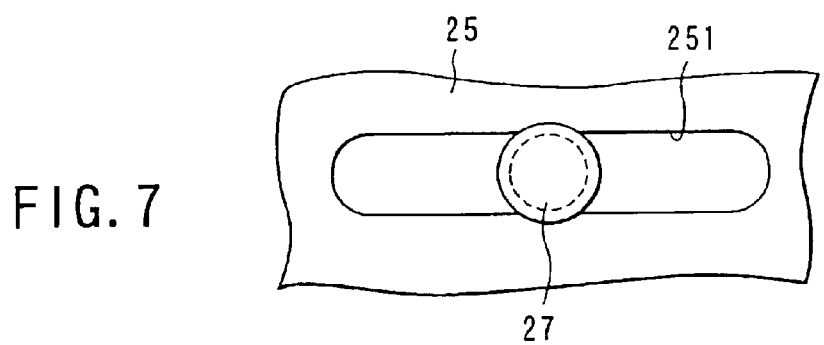
FIG. 7
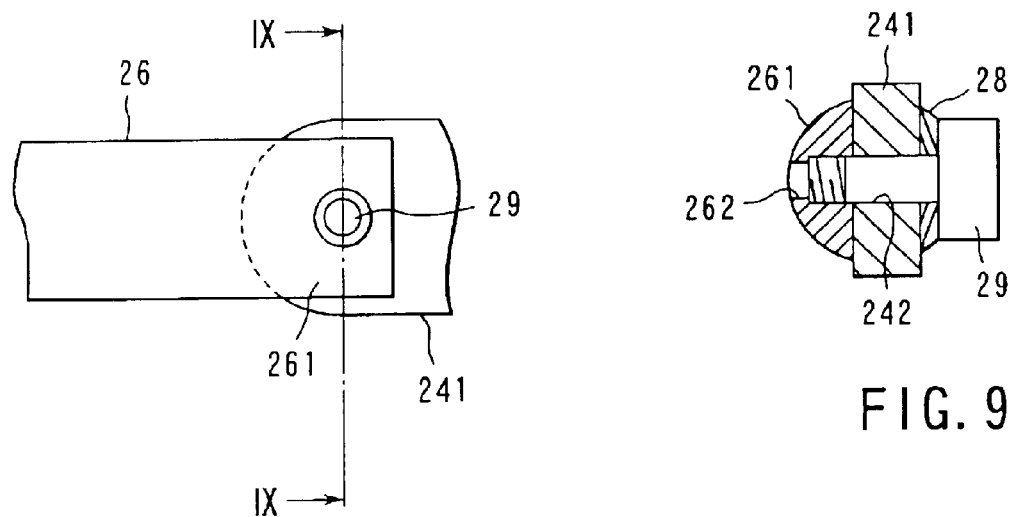
FIG. 8
FIG. 9

MICROSCOPE

CROSS-REFERENCE TO RELATED APPLICATIONS

This application is based upon and claims the benefit of priority from the prior Japanese Patent Application No. 2001-395141, filed Dec. 26, 2001, the entire contents of which are incorporated herein by reference.

BACKGROUND OF THE INVENTION

1. Field of the Invention

The present invention relates to a microscope in which optical images of samples such as a cell tissue and microorganism are converted to electric signals and observed as image data.

2. Description of the Related Art

In recent years, in a field of education, education in which computer is utilized has been advanced. This computer education is not limited simply to the learning of operation of the computer, and various types of educations in which the computer is actually used have been considered.

For example, also a science education is not limited to direct observation of cell tissues and microorganisms using a microscope, and it has been considered that an observation image is generated as an image signal and observed on the computer.

Then, as the microscope which can generate the image signal, a microscope has been developed comprising: an optical system including a linear optical axis and disposed under a stage portion on which a sample is laid; and an image pickup portion in which an image pickup device is disposed in an image forming position of the optical system. This microscope takes in an optical image of the sample laid on the stage portion by the optical system, and converts the optical image to an electric signal by the image pickup device to generate the image signal.

Since the optical system including the linear optical axis is disposed between the stage portion and image pickup device in the microscope, the microscope can be reduced in size and weight so as to obtain superior portability. Moreover, high-precision image data can be acquired. Therefore, the microscope has a characteristic that various types of educations such as the science education using the image signal can readily be realized.

Additionally, in the microscope, for the observation of more types of samples, in order to attract the interest of a large number of people, the sample on the stage portion is brought under lighting such as deflected lighting to give a clear contrast to the image data. A lighting mechanism in which various lighting modes are possible in this manner is added, and the microscope is thereby considered to contribute to fields of education such as the science education.

In the lighting mechanism in which a plurality of lighting modes are possible, a lighting head is attached to one end of an arm, and the other end of the arm is rotatably assembled/disposed in a microscope main unit. Moreover, it is considered that the other end of the arm is rotated in accordance with the lighting mode and an irradiation angle of a lighting light from the lighting head is set.

However, in the lighting mechanism, when the lighting head is simply rotatably assembled in the microscope main unit, a lighting position for irradiating the sample on the sample laying surface of the stage portion changes, and it disadvantageously becomes difficult to realize a desired lighting mode such as deflected lighting.

BRIEF SUMMARY OF THE INVENTION

The present invention has been developed in consideration of the above-described circumstances, and an object thereof is to provide a microscope in which an observation mode having a high degree of freedom is realized, a convenient and easy change of a lighting mode can further be realized, and acquisition of high-precision image data can be realized in each lighting mode.

According to the present invention, there is provided a microscope comprising: a stage portion on which a sample is laid; an optical portion which is disposed confronting a surface opposite to a sample laying surface of the stage portion and whose optical axis is linearly disposed to take in an optical image of the sample laid on the stage portion; an image pickup portion which is disposed in an image forming position of the optical portion and which converts the optical image of the sample formed by the optical portion into an electric signal; and a lighting mechanism including a plurality of position adjustment portions which variably adjust an irradiation direction of a lighting head for irradiating the sample laid on the stage portion with a lighting light to set a lighting mode.

According to the above-described constitution, the image pickup portion is disposed confronting the lower surface of the stage portion via the optical portion whose optical axis is linearly disposed, and the lighting head is assembled/disposed so as to be rotatable/adjustable with respect to the stage portion via a plurality of position adjustment portions. When the plurality of position adjustment portions are adjusted/operated, the lighting mode of the sample on the stage portion is variably set, and the image data in each lighting mode can be acquired in the image pickup portion. Thereby, a microscope structure which can easily be transferred and handled is realized, it is further possible to acquire the image data having a good precision in each lighting mode, and diversification of the observation mode is easily realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a sectional view showing an extracted slide structure of the second arm of FIG. 5;

FIG. 7 is a plan view showing an appearance of the slide structure of the second arm of FIG. 5;

FIG. 8 is a side view showing the rotation structure of the lighting head of FIG. 5;

FIG. 9 is a sectional view of a section taken along line IX—IX of FIG. 8;

DETAILED DESCRIPTION OF THE INVENTION

Embodiments of the present invention will be described hereinafter in detail with reference to the drawings.

Figure 1:
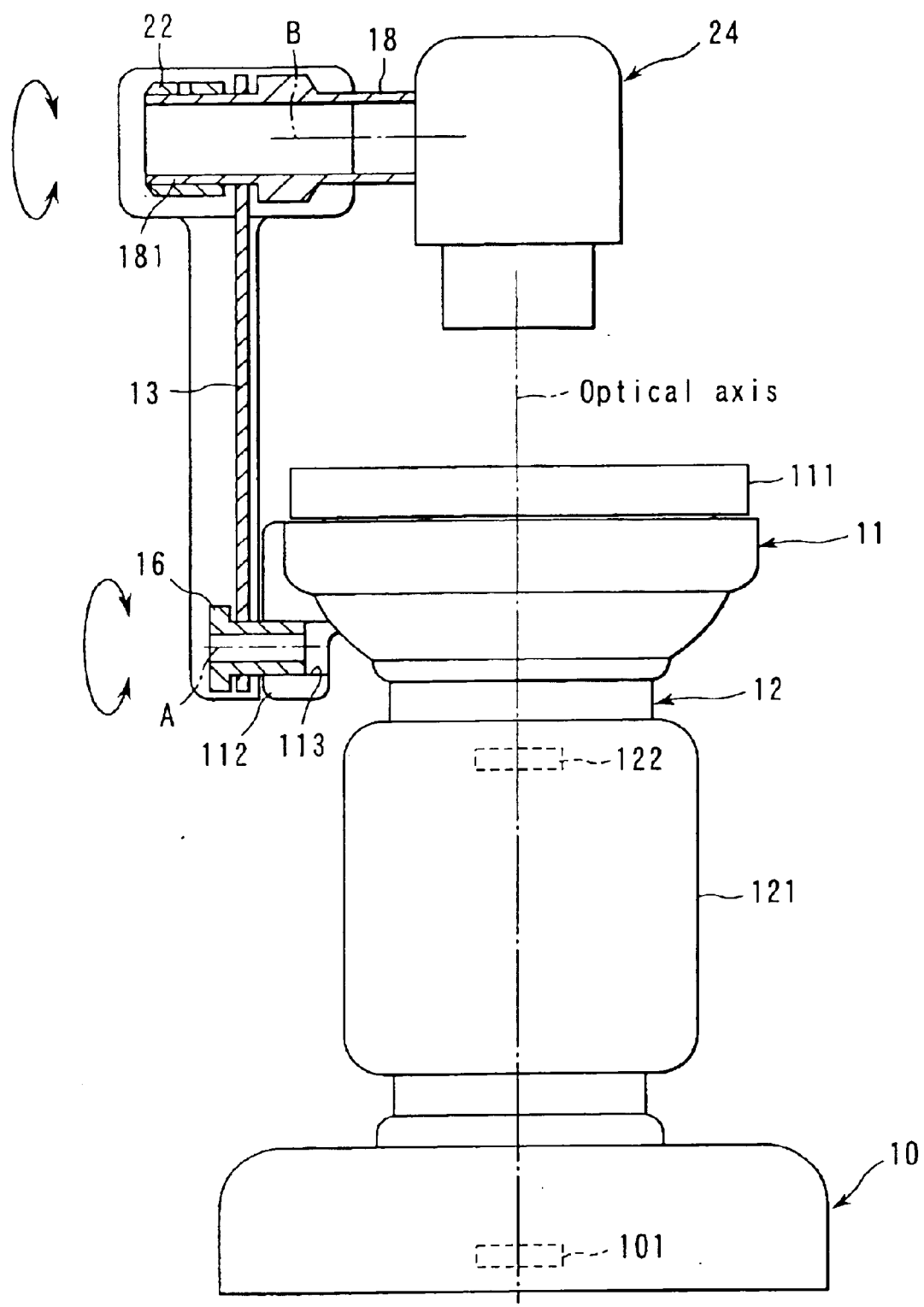
FIG. 1 is a partially sectional view showing a section of a part of a microscope according to one embodiment of the present invention.

FIG. 1 shows a microscope according to one embodiment of the present invention. A stage portion 11 on which a sample is to be laid is assembled/disposed at a predetermined interval via an optical portion 12 on a base 10 including an image pickup portion. A stage plate 111 is disposed on the stage portion 11, for example, so that the plate can be moved/adjusted in a horizontal plane. The position of the stage plate 111 is adjusted with respect to the stage portion 11 by adjustment of an operation portion (not shown).

Moreover, in the optical portion 12, an optical member 122 including a linear optical axis is disposed confronting the stage plate 111, and this optical member 122 takes in an optical image of the sample laid on the stage plate 111.

The optical member 122 includes, for example, a zoom lens. In cooperation with a rotation operation of an operation ring 121 disposed so that the ring can rotate/operate around the optical portion 12, the zoom lens is moved/adjusted in an optical axis direction to selectively enlarge or reduce the optical image of the sample laid on the stage plate 111. Moreover, the optical portion 12 includes a focus adjustment portion (not shown), and is constituted such that the focus of the optical member 122 can be adjusted.

Furthermore, in the base 10, an image pickup device 101 is disposed with respect to an image forming position of the optical member 122, and the optical image taken in by the optical member 122 is formed in the image pickup device 101. The base 10 converts the optical image into the electric signal by the image pickup device 101, processes the electric signal to generate the image signal, and outputs the signal to external apparatuses such as a personal computer via output means (not shown).

As described above, the base 10 including the image pickup device 101 is disposed confronting the underside of the stage portion 11 via the optical portion 12 including the optical member 122 so that the optical axis is linearly formed. With use of the microscope structure, the constitution can be miniaturized and further simplified. Additionally, since the constitution of the optical portion 12 is simplified, it is possible to acquire the image data having a good precision.

Moreover, an arm attachment portion 112 for assembling a lighting head is attached to the stage portion 11, and this arm attachment portion 112 includes, for example, a screw hole 113 formed so as to substantially cross at right angles to the optical axis. Furthermore, in the arm attachment portion 112, a first arm 13 constituting a lighting mechanism is assembled so as to be rotatable around an axis A.

Figure 2:
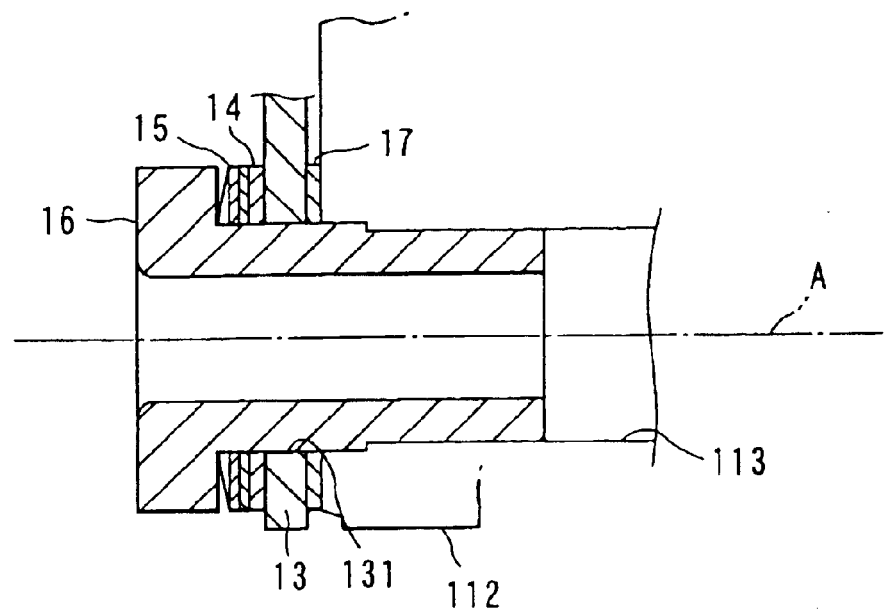
FIG. 2 is a sectional view showing an extracted rotation structure of a first arm of FIG. 1.

As shown in FIG. 2, an insertion hole 131 constituting the position adjustment portion is disposed in one end of the first arm 13, and connected to the screw hole 113 of the arm attachment portion 112. For the first arm 13, an attachment screw member 16 to which a washer 14 and a leaf spring 15 for producing a rotation force are attached in order is inserted in the insertion hole 131. In this state, a washer 17 is attached to the tip end of the attachment screw member 16, and the member is screwed into the screw hole 113 of the arm attachment portion 112.

Here, one end of the first arm 13 is rotatably attached to the arm attachment portion 112. In this attached state, an elastic force of the attachment screw member 16, washers 14, 17, and leaf spring 15 is given to one end of the first arm 13, and the arm is rotated/urged by a friction force against the elastic force. Moreover, in the rotated position, the first arm 13 is urged in an axial direction, regulated in the position, and positioned by the elastic force of the leaf spring 15.

Figure 3:
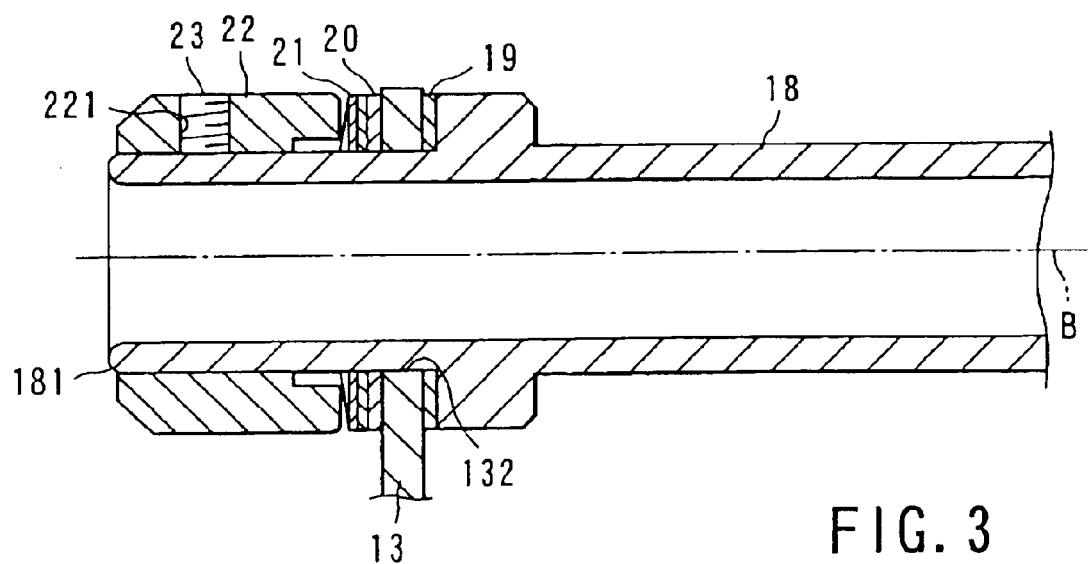
FIG. 3 is a sectional view showing an extracted rotation structure of a second arm of FIG. 1.

Moreover, as shown in FIG. 3, an attachment hole 132 constituting the position adjustment portion is disposed in the other end of the first arm 13. Furthermore, in the attachment hole 132 of the first arm 13, a rotation portion 181 disposed on one end of a second arm 18 is attached so as to be rotatable around an axis B.

A washer 19 is attached to the periphery of the rotation portion 181 of the second arm 18, and the portion is inserted into the attachment hole 132 of the first arm 13. Thereafter, a washer 20, and a leaf spring 21 for producing the rotation force are attached to the periphery of the tip end of the second arm in order, and further a fixing ring 22 is attached. In the fixing ring 22, a screw hole 221 is formed substantially at right angles to the axis B, and a screw member 23 is screwed in the screw hole 221 and attached to the rotation portion 181 of the second arm 18.

Here, the rotation portion 181 of the second arm 18 is urged in the axial direction with respect to the attachment hole 132 of the first arm 13 by the elastic force produced by the function of the fixing ring 22, washers 19, 20, and leaf spring 21, and is rotated/urged with respect to the attachment hole 132 of the first arm 13 against the elastic force. Moreover, in the rotated position, the second arm 18 is urged in the axial direction by the elastic force of the leaf spring 21, the position of the arm is regulated, and the arm is positioned.

Moreover, a lighting head 24 is disposed on the other end of the second arm 18 (see FIG. 1). When an external electric power is supplied to the lighting head 24, for example, via a cable (not shown), the lighting head emits a lighting light in a desired irradiation direction. It is to be noted that a battery may also be disposed as a power source structure of the lighting head 24.

Figure 4:
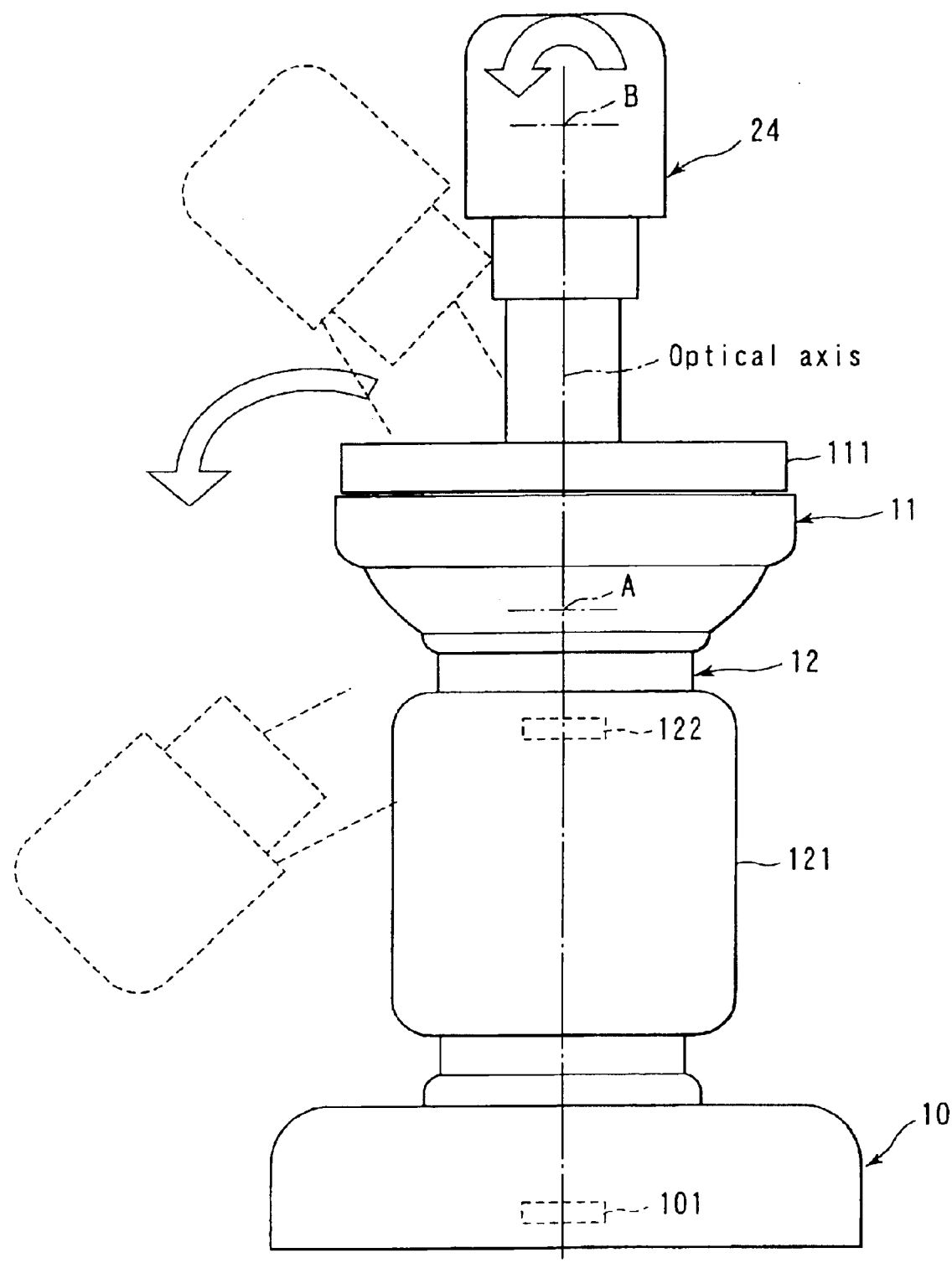
FIG. 4 is a plan view showing an adjustment operation of a lighting head of FIG. 1.
Figure 5:
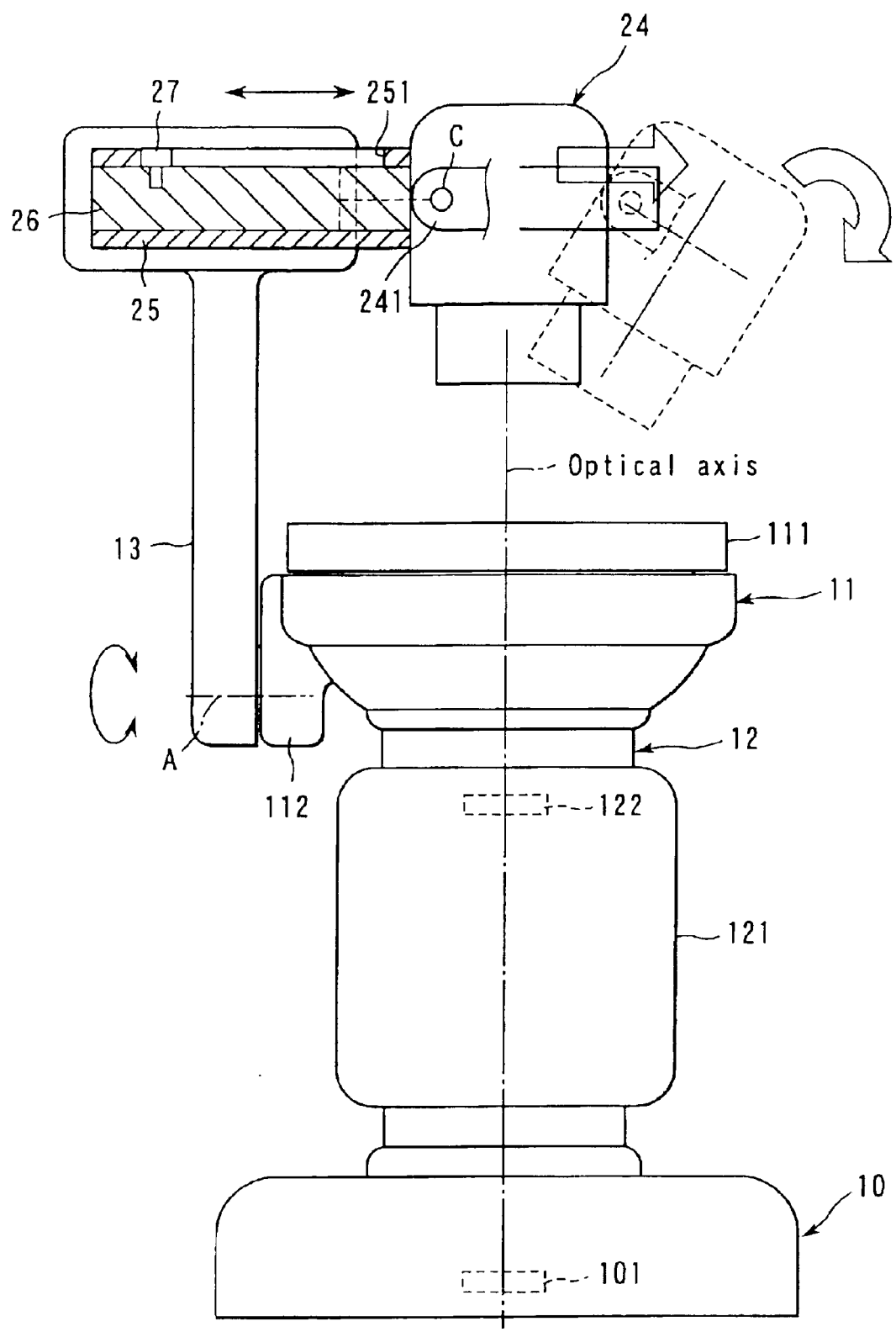
FIG. 5 is a partially sectional view showing a section of a part of the microscope according to another embodiment of the present invention.

By the above-described constitution, to set a lighting mode of the sample laid on the stage plate 111 of the stage portion 11, for example, as shown by a broken line in FIG. 4, the first arm 13 is rotated/urged around the axis A against the elastic force of the leaf spring 15. Then, the first arm 13 is rotated together with the second arm 18. In a position where the rotating/urging is released, the elastic force of the leaf spring 15 urges the arm in the axial direction in the rotated position to regulate the position, so that the arm is positioned. Here, the lighting head 24 supported by the second arm 18 keeps the rotated state around the axis A which substantially crosses at right angles to the optical axis.

In this state, when the second arm 18 is rotated/urged around the axis B centering on the attachment hole 132 of the first arm 13 against the elastic force of the leaf spring 21, the lighting head 24 is rotated together with the second arm 18. Moreover, when the rotating/urging of the second arm 18 is released, the second arm 18 is urged in the axial direction in the rotated position, regulated in the position, and positioned by the elastic force of the leaf spring 21. Thereby, the lighting head 24 is rotated around two axes, the irradiation direction of the head is set to a desired state, and a desired lighting mode such as deflected lighting is set.

As described above, for the microscope, under the stage portion 11, the base 10 including the image pickup device 101 is disposed confronting the stage portion via the optical portion 12 whose optical axis is linear. The lighting head 24 is assembled/disposed with respect to the stage portion 11 so as to be rotatable/adjustable around two axes which are different from the optical axis via the first and second arms 13, 18.

According to this constitution, the lighting head 24 is rotated/adjusted around two axes via the first and second arms 13, 18, and thereby it is possible to easily adjust the irradiation direction of the lighting head 24 to a desired position on the optical axis in the desired lighting mode such as the deflected lighting. As a result, in a microscope structure in which the handling including the transferring is securely simplified, the image data having good precision can be acquired in various lighting modes, and an observation mode can be diversified.

It is to be noted that in the embodiment the positioning mechanism for positioning the first and second arms 13, 18 in the respective rotated positions has been described with the constitution using the elastic forces of the leaf springs 15, 21. However, the present invention is not limited to this embodiment, and other members can also be used in the constitution. Moreover, the first and second arms 13, 18 are assembled/disposed so as to be rotatable/adjustable, respectively, and a structure for producing the rotating force is not limited to the above-described structure. Additionally, for example, in a positioning mechanism in which the first and second arms 13, 18 are releasably held in the respective rotation/adjustment positions, a force adjustment lever can also be disposed, so that an observer can arbitrarily adjust the rotation force.

Moreover, in the above-described embodiment, the constitution including the position adjustment portion has been described in which the lighting head 24 is disposed so as to be rotatable around two axes different from the optical axis. However, the number of the position adjustment portions is not limited to the above-described number. For example, a constitution shown in FIGS. 5 to 9 or FIGS. 10 and 11 is also possible. Additionally, in FIGS. 5 to 11, the same part as that of FIGS. 1 to 4 is denoted with the same reference numerals, and the description thereof is omitted.

First, in the embodiment shown in FIGS. 5 to 9, the first arm 13 is assembled so as to be rotatable around the axis A with respect to the arm attachment portion 112 of the stage portion 11 in the same manner as in the embodiment shown in FIG. 1. Moreover, a second arm 25 is attached to the other end of the first arm 13 to substantially cross at right angles.

The second arm 25 is formed, for example, in a cylindrical shape, and a movement member 26 constituting the position adjustment portion is fitted in the second arm 25 so as to be movable in the axial direction. In this second arm 25, as shown in FIGS. 6 and 7, a guide hole 251 is formed in the axial direction, and a fixing screw 27 is movably inserted in the guide hole 251. This fixing screw 27 is attached to the movement member 26.

Thereby, when the fixing screw 27 of the movement member 26 is loosened, the fixing screw 27 can move along the guide hole 251 of the second arm 25, and the movement of the member is adjusted with respect to the second arm 25. Moreover, when the fixing screw 27 is tightened, the fixing screw 27 is pressed onto the second arm 25, and the movement member 26 is thereby positioned in the moved position.

Moreover, as shown in FIGS. 8 and 9, a cut portion 261 constituting the position adjustment portion and cut, for example, in a semicircular shape is formed in the tip end of the movement member 26, and a screw hole 262 is formed in the cut portion 261. Moreover, an attachment portion 241 formed in the lighting head 24 is attached to the cut portion 261 so as to be rotatable around an axis C.

The attachment portion 241 includes an insertion hole 242 which is connected to the screw hole 262. Moreover, a screw member 29 is inserted through the insertion hole 242 of the attachment portion 241 via a leaf spring 28. After the screw member 29 is inserted through the insertion hole 242 of the attachment portion 241, the tip end of the screw member is screwed in the screw hole 262 of the cut portion 261 of the movement member 26. Thereby, when the lighting head 24 is rotated/urged around the axis C centering on the screw member 29 against the elastic force of the leaf spring 28, the head is rotated around the axis C, and the rotation angle of the head is adjusted. Moreover, when the rotating/urging of the lighting head 24 is released in the rotated position, the attachment portion 241 is urged in the axial direction by the elastic force of the leaf spring 28, the position of head is regulated in the rotated position, and the head is positioned.

That is, in this embodiment, the lighting head 24 is moved/adjusted around the axis A via the first arm 13. Subsequently, the second arm 25 is contracted/expanded and adjusted in the axial direction, and in the contracted/expanded position, the lighting head 24 is rotated with respect to the second arm 25. In this manner, the position of the lighting head 24 is adjusted in three places, so that the lighting mode is varied/adjusted.

Figure 10:
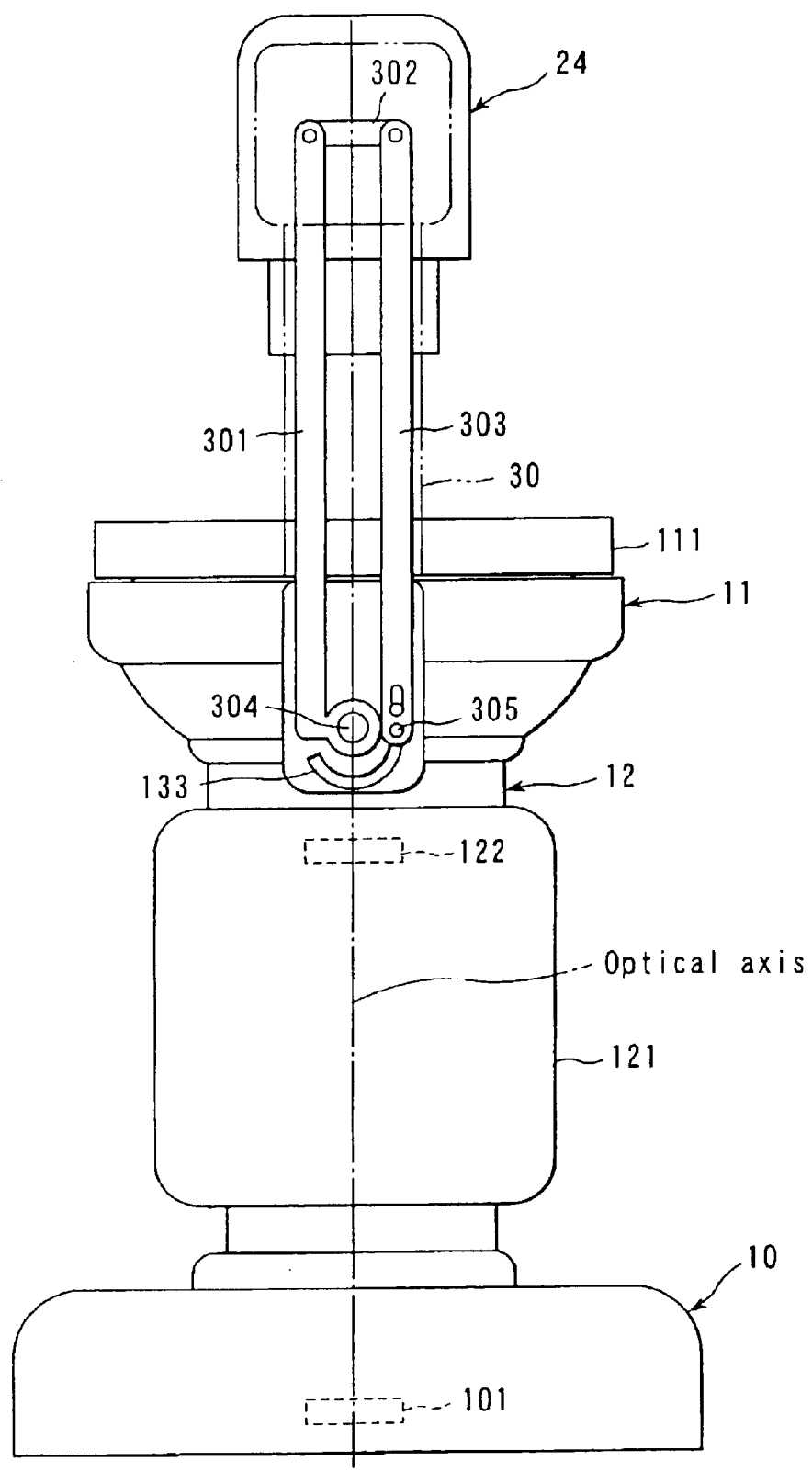
FIG. 10 is a plan view showing an arrangement constitution of a major part of the microscope according to another embodiment of the present invention.
Figure 11:
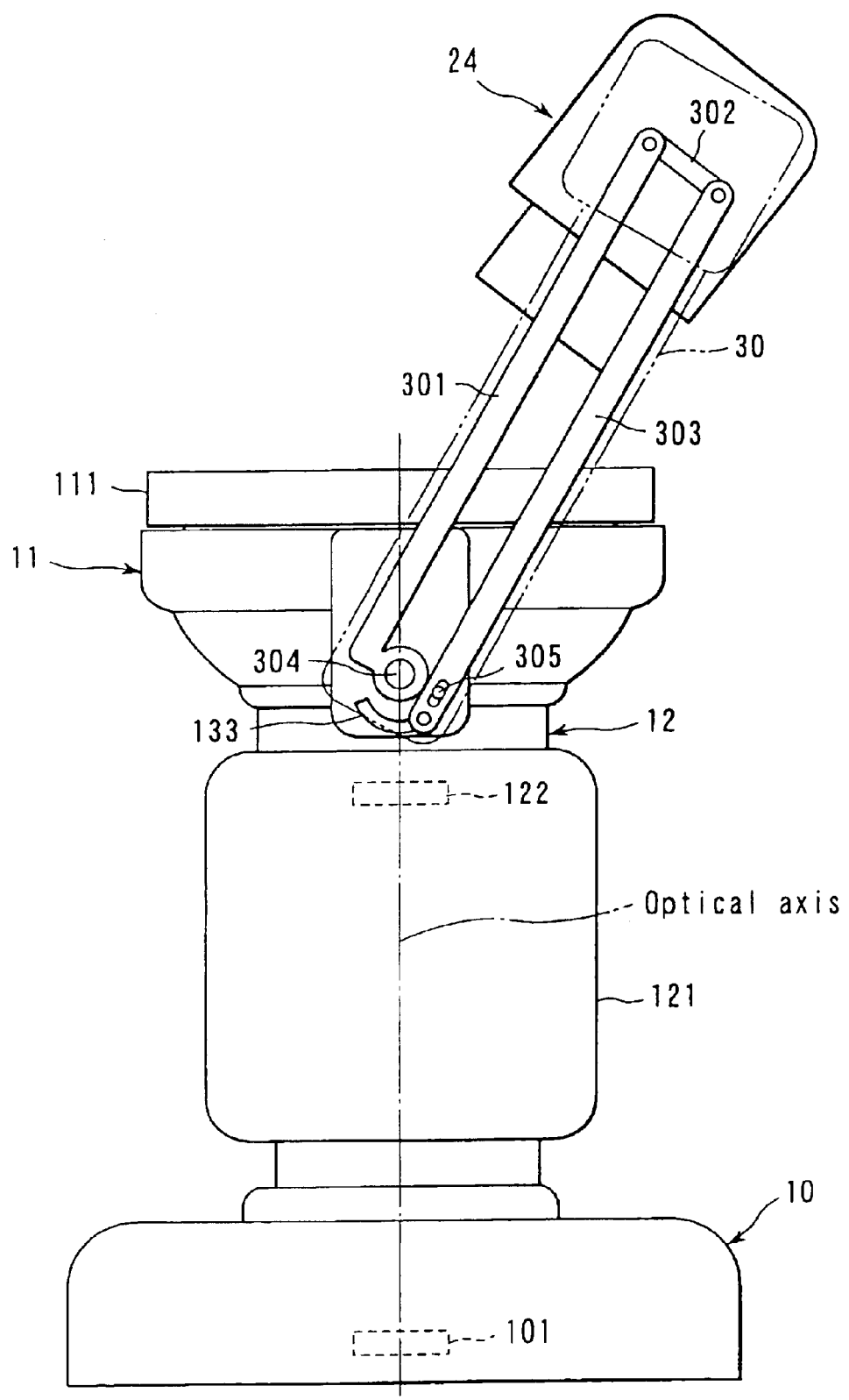
FIG. 11 is a constitution diagram showing the adjustment operation of the lighting head of FIG. 10.

Moreover, in the embodiment shown in FIGS. 10 and 11, between the stage portion 11 and lighting head 24, a second arm 30 as the position adjustment portion is assembled/disposed which is constituted, for example, by linking/connecting three link members 301, 302, 303 constituting a link mechanism substantially in a quadrangular shape. The tip end of the link member 301 is rotatably supported by the second arm 30 via a rotation shaft 304. Moreover, a driving pin 305 is formed in the link member 303 constituting the second arm 30. For example, this driving pin 305 is engaged in a driving cam groove 133 formed in a predetermined shape in the stage portion 11 so that the pin can be driven.

Moreover link member 302, which is one of three link members 301, 302, 303 constituting the second arm 30, has its linked/connected portion rotatably supported by the lighting head 24.

In the above-described constitution, for the second arm 30, when the lighting head 24 is moved in an irradiation position, the link member 301 is rotated/urged centering on the rotation shaft 304 as shown in FIG. 11 and with the rotating/urging, the link members 302, 303 are rotated/urged in order. At this time, the driving pin 305 of the link member 303 is guided along the driving cam groove 133 of the first arm 13. Thereby, for example, as shown in FIG. 11, the link members 301, 302, 303 constituting the second arm 30 are rotated in accordance with the position assumed by the lighting head 24.

Here, when the positions of these link members 301, 302, 303 are regulated in the moved positions, the desired lighting direction of the lighting head 24 is secured. According to this embodiment, when the irradiation position of the lighting head 24 is only varied/adjusted, it is possible to constantly irradiate the sample on the stage plate 111 of the stage portion 11. As a result, the observer's lighting/adjusting operation for adjusting the irradiation direction can be simplified.

Moreover, in the embodiment, the constitution has been described in which the link members 301, 302, 303 between the first arm 13 and lighting head 24 are linked/connected and moved with respect to one another. However, instead of the linking/connecting structure, for example, a wire coupling or gear connecting structure may also be used to constitute the link members such that the members are moved with one another.

Furthermore, the present invention is not limited to the above-described embodiment. For example, the position adjustment portion may also be constituted such that a rotation portion is disposed in a middle portion of the first arm 13 and second arms 18, 25 and formed so as to be bendable, and the middle portion of the first arm 13 and second arms 18, 25 is bent/adjusted via the rotation portion in a rotary manner.

Moreover, the present invention is not limited to the above-described embodiments. Additionally, for example, the position adjustment portions described above in the respective embodiments may also appropriately be combined.

Figure 12:
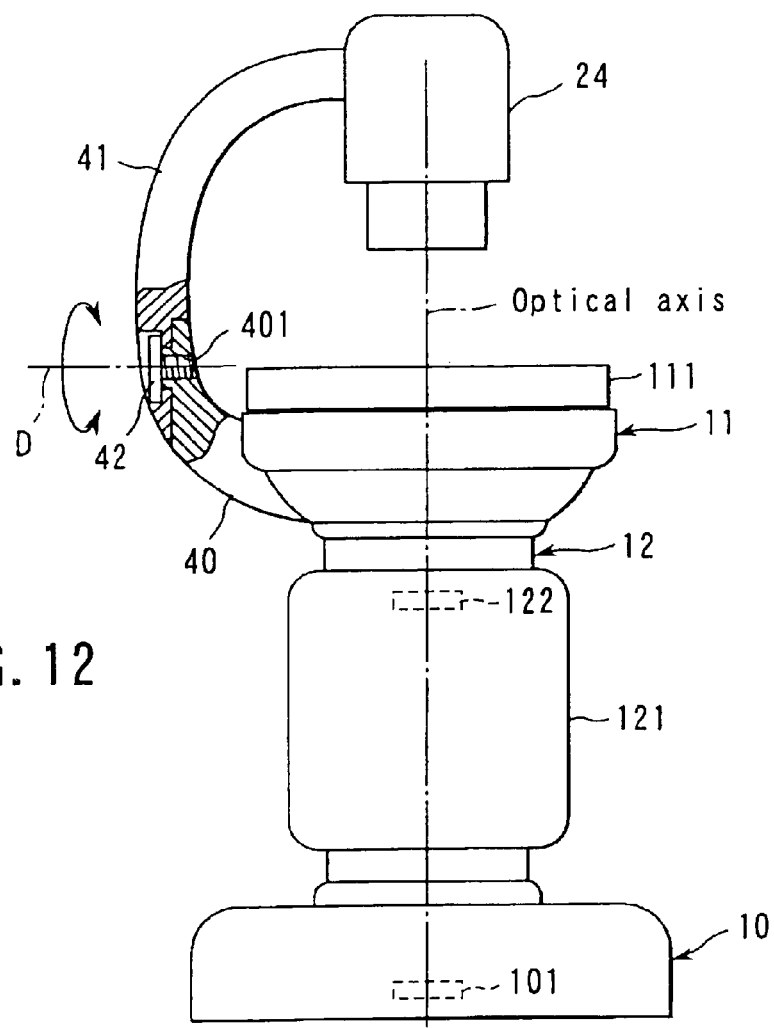
FIG. 12 is a partially sectional view showing the arrangement constitution of the major part of the microscope according to another embodiment of the present invention.
Figure 13:
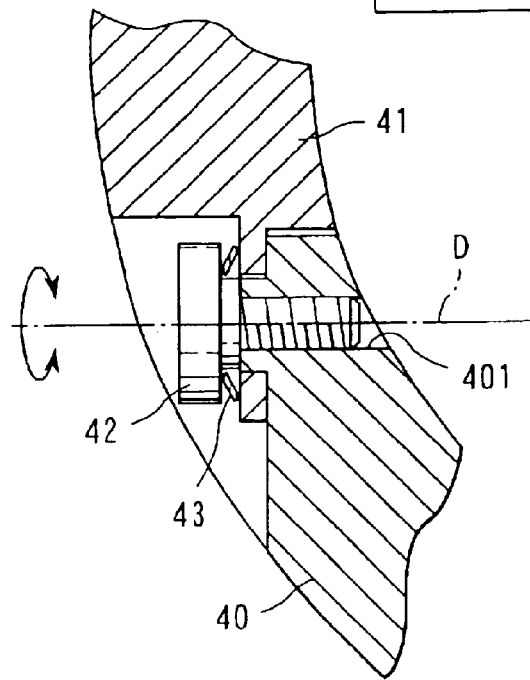
FIG. 13 is an enlarged sectional view of the major part of FIG. 12.

Furthermore, the present invention is not limited to the above-described embodiments. Additionally, even when the above-described lighting head 24 is disposed/constituted as shown in FIGS. 12 and 13, substantially the same effect as that of the above-described embodiment is anticipated. Additionally, in FIGS. 12 and 13, for the sake of convenience, the same parts as those of FIGS. 1 to 4 are denoted with the same reference numerals, and the description thereof is omitted.

That is, in the embodiment shown in FIGS. 12 and 13, an arm attachment portion 40 constituting the position adjustment portion is disposed with respect to a sample laying surface of the stage plate 111 of the stage portion 11, and a screw hole 401 is disposed in the tip end of the arm attachment portion 40. Moreover, for example, a screw member 42 constituting a positioning mechanism is used to screw the base end of a curved arm 41 in the screw hole 401 so that the screw connection can be adjusted.

Thereby, the base end of the arm 41 is attached to the arm attachment portion 40 through a leaf spring 43 so as to be rotatable around an axis D centering on the screw member 42. The axis D as a rotation support point of the arm 41 is disposed on the same plane as the sample laying surface of the stage plate 111 and is desirably on an axis that crosses at right angles to the optical axis of the optical portion 12.

Moreover, the lighting head 24 is attached to the tip end of the arm 41. A portion of the sample laying surface of the stage plate 111, intersecting with the optical axis of the optical portion 12, is irradiated with the irradiation light of the lighting head 24.

According to the constitution, for the lighting head 24, when the screw member 42 screwed in the base end of the arm 41 is loosened, and the arm 41 is rotated using the screw member 42 as the axis D, the irradiation direction of the lighting light is variable. Here, the portion of the sample laying surface of the stage plate 111, intersecting with the optical axis of the optical portion 12, is irradiated with the lighting light of the lighting head 24 in each rotated position. As a result, the desired lighting mode of the lighting head 24 is obtained in accordance with the rotated position of the arm 41 without changing the irradiated portion on the stage plate 111.

The arm 41 is positioned with respect to the arm attachment portion 40, and the portion of the sample laying surface of the stage plate 111 on the optical axis is irradiated with the lighting light by the lighting head 24.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A microscope comprising:

a stage portion on which a sample is laid;

an optical portion which faces a surface opposite to a sample laying surface of the stage portion, and which has an optical axis along which an optical image of the sample laid on the stage portion is taken;

an image pickup portion which is provided at an image forming position of the optical portion, and which converts the optical image of the sample into an electric signal; and a lighting selecting mechanism including a plurality of position adjustment portions which variably adjust an irradiation direction of a lighting head for irradiating the sample laid on the stage portion to selectably set one of a plurality of lighting modes, including transillumination, upper deflected lighting, and lower deflected lighting.

2. The microscope according to claim 1, wherein the plurality of position adjustment portions comprise:

a first position adjustment portion which is provided at the stage portion so as to be rotatable around a first axis to adjust the lighting head around the first axis; and a second position adjustment portion which is connected to the first position adjustment portion so as to be rotatable around a second axis that is parallel to the first axis to adjust the lighting head around the second axis.

3. The microscope according to claim 2, wherein the first and second position adjustment portions are connected to each other via a link mechanism so that the position adjustment portions are adapted to cooperate with each other around the first and second axes.

4. The microscope according to claim 3, further comprising a positioning mechanism which releasably maintains the first and second position adjustment portions in adjustment positions.

5. The microscope according to claim 2, further comprising a positioning mechanism which releasably maintains the first and second position adjustment portions in adjustment positions.

6. The microscope according to claim 2, wherein the first axis perpendicularly intersects the optical axis of the optical portion.

7. The microscope according to claim 1, wherein the plurality of position adjustment portions comprise:
   a first position adjustment portion which is provided at the stage portion so as to be rotatable around a first axis and to adjust the lighting head around the first axis; and
   a second position adjustment portion which is disposed with respect to the first position adjustment portion so as to be movable in an axial direction of a second axis that is parallel to the first axis, and so as to be rotatable around an axis perpendicular to the second axis, to adjust the lighting head in the axial direction of the second axis and around the axis perpendicular to the second axis.

8. The microscope according to claim 7, further comprising a positioning mechanism which releasably maintains the first and second position adjustment portions in adjustment positions.

* * * * *